(12) United States Patent
Schaham

(10) Patent No.: US 6,208,465 B1
(45) Date of Patent: Mar. 27, 2001

(54) METHOD AND APPARATUS FOR IMAGING AN OBJECT BY DIFFRACTIVE AUTOFOCUS

(75) Inventor: Moshe Schaham, Rishon Lezion (IL)

(73) Assignee: Galore Scantec Ltd., Ness Ziona (IL)

( * ) Notice: Subject to any disclaimer, the term of this patent is extended or adjusted under 35 U.S.C. 154(b) by 0 days.

(21) Appl. No.: 09/403,570

(22) PCT Filed: Apr. 17, 1998

(86) PCT No.: PCT/US98/07884

§ 371 Date: Jan. 13, 2000

§ 102(e) Date: Jan. 13, 2000

(87) PCT Pub. No.: WO98/49522

PCT Pub. Date: Nov. 5, 1998

(30) Foreign Application Priority Data

Apr. 25, 1997 (IL) ........................................................ 120726

(51) Int. Cl.[7] ........................... G02B 27/42; G02B 27/44; G02B 27/40; G02B 21/00
(52) U.S. Cl. ........................... 359/558; 359/565; 359/566; 250/201.2; 250/201.4; 250/201.8; 356/375; 356/372
(58) Field of Search ........................................ 359/565, 566, 359/558; 356/375, 372, 376, 301, 328; 250/201.4, 201.8

(56) References Cited

U.S. PATENT DOCUMENTS 4,725,721  2/1988  Nakamura et al. .
5,165,063  11/1992  Strater et al. ..................... 250/201.4

*Primary Examiner*—Audrey Chang
(74) *Attorney, Agent, or Firm*—Evenson, McKeown, Edwards & Lenahan, P.L.L.C.

(57) ABSTRACT

A method and apparatus for illuminating and imaging two-dimensional and three-dimensional objects located at various distances. The apparatus includes a non-monochromatic light source, a diffractive optical element having a strong chromatic aberration that focuses the light beam generated from the source at various focal distances at where the various objects are located. The light beams are then reflected by the various objects and are received through the diffractive optical element onto an imager.

9 Claims, 7 Drawing Sheets

METHOD AND APPARATUS FOR IMAGING AN OBJECT BY DIFFRACTIVE AUTOFOCUS

FIELD OF THE INVENTION

The present invention relates to the field of illuminating and imaging objects at various distances, and more particularly, to an optical autofocusing apparatus and method.

BACKGROUND OF THE INVENTION

The recent commercialization of a class of optics known as diffractive optics have enabled some novel ideas to be realized in the area of imaging. Diffractive optics use the wave nature of light to bend and steer it to almost any shape imaginable A simple diffractive lens performs nearly the same function as its refractive counter part (focuses parallel light to a point or forms a real image) but does it in an entirely different way.

A refractive lens bends light in a predictable way as a light ray crosses a surface boundary of differing indices of refraction (a measure of the material's light slowing effect) at an angle to the surface normal. Thus a typical refractive lens has at least one curved surface to direct parallel light rays towards a common focus.

A diffractive lens uses small indentations etched or embossed in the surface of a transparent material to deflect light. This bending is a result of constructively interfering wave fronts (called orders) and is a predictable result of the wave nature of light.

A simple positive diffractive lens has rings of carefully etched grooves of varying width and depth. The grooves tend to get narrower (more dense) towards the edges of the lens because narrower grooves bend light at steeper angles towards the common focus. The lens, however, is more wavelength (color) sensitive than its refractive counterpart. This means light of different colors are focused at different distances from the lens. In normal imaging, this high degree of chromatic aberration is an undesirable effect and is termed "chromatic aberration."

Frequently it is necessary for an optical system to image objects which are located at various distances, at a fixed image plane. To avoid deterioration of the image sharpness as a result of defocusing, an axial adjustment is made to the optical system, which involves moving the entire optical system or any of its optical elements. Various autofocus systems have been developed through the years, which use several defocusing sensing techniques and optical element moving techniques. These are based on at least one moving optical element.

The conventional defocus detection and moving schemes, usually complicate such systems and affects their reliability and cost. The operation of such "autofocus" mechanisms is rime consuming, even with the advent of electronics and of computer processing speed. This can be sometimes detrimental to the operation of the system.

Furthermore, frequently the object surface is not planar or if it is planar, its plane is not parallel to the detector plane. Thus, the autofocus mechanism performance is still limited by the depth of field of the optical system.

SUMMARY OF THE INVENTION

The present invention utilizes the high degree of chromatic aberration of diffractive optics for focusing images of objects located at various distances, comprising: illuminating the object with a slit-shaped illuminating nonmonochromatic light beam; focusing the image of the narrow slit via a diffractive optical element, so that a sharp image of the slit for varying wavelengths is obtained at varying distances, with unequivocal dependence between light wavelength and object distance; imaging the beam reflected from the illuminated area of the object, via the same diffractive optical element, onto an Imager so that a sharp image of the object's surface is obtained in the imager plane, at the wavelength of the focused illumination line, corresponding to the specific distance to the object.

The present invention utilizes the different focal distances of different light wavelengths to provide an autofocus function that does not have any moving parts. This accomplishes the general objective of providing an autofocus function without any moving parts, thus simplifying the optical system, decreasing its cost, and increasing its reliability in comparison to conventional moving autofocus systems.

Another object of the invention is to apply the autofocus function to any part of an object, regardless of its shape and position, relative to a plane parallel to the detector plane. This is accomplished by a scanning mirror or by any other scanning technique which deflects the light beam across the scanned surface to form a field in which an image can be acquired.

Yet an additional object of the invention is to provide an illumination section that is an alternative to a more complex, more expensive laser based illumination system. This objective is accomplished by providing a nonmonochromatic light source to illuminate the scanned image.

Yet an additional object of the invention is to provide a simple and inexpensive system for the three dimensional measurement of objects. This is accomplished by providing a rotating mirror or any other scanning technique that scans an object perpendicular to the slit direction and a spectral analysis device to extract the spectrum of the return beam at each pixel in the image plane, to measure the shape of the surface of a 3D object.

The foregoing and other objects and advantages of the invention will appear from the following description. In the description, reference is made to the accompanying drawings which form a part hereof, and in which there is shown by way of illustration a preferred embodiment of the invention.

DETAILED DESCRIPTION OF THE INVENTION

Figure 1:
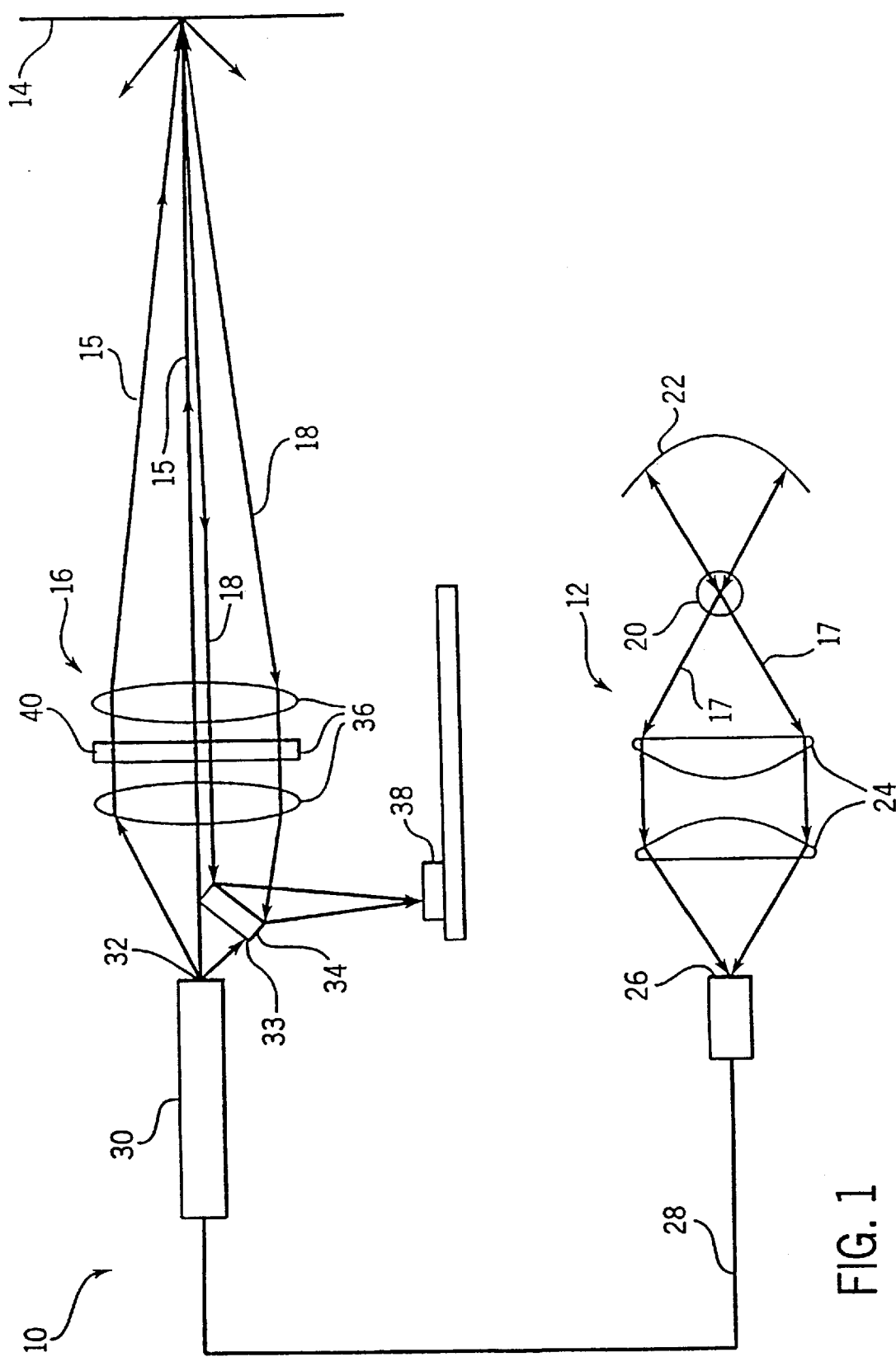
FIG. 1 is a schematic illustration of a first embodiment of an imaging apparatus incorporating the present invention.

Referring particularly to the schematic in FIG. 1, an optical system 10 for use in a two dimensional barcode reader has an illumination section 12 to illuminate a target, such as a barcode 14, and an imaging section 16 for focusing light on the barcode 14 and detecting the reflected barcode image.

The illumination section 12 includes a non-monochromatic light source 20, such as a Halogen lamp, having a spectrum across the visible and non-visible range. A spherical rear reflector 22 disposed behind the light source 20 "collects" light that is rearwardly emitted by the light source and reflects the light forwardly. An illuminating lens system 24 interposed between the light source 20 and an input end 26 of a fiber optic bundle 28 "launches" forwardly directed light 17 into the fiber optic bundle 28.

Figure 3:
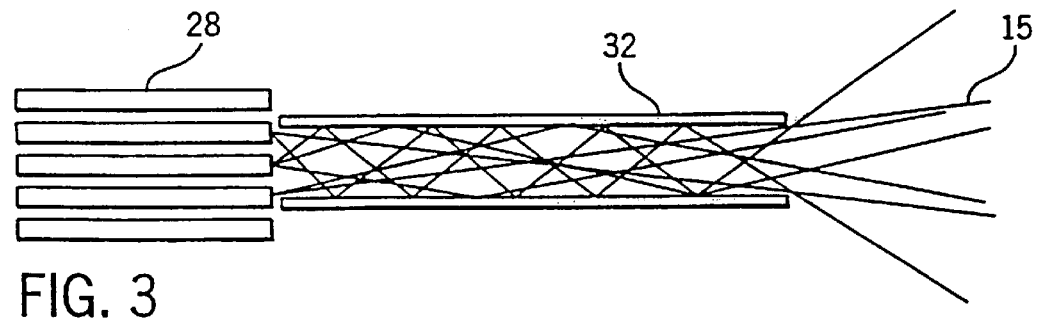
FIG. 3 is a cross sectional blown up view of the output end of the fiber optic bundle of FIG. 1.
Figure 4:
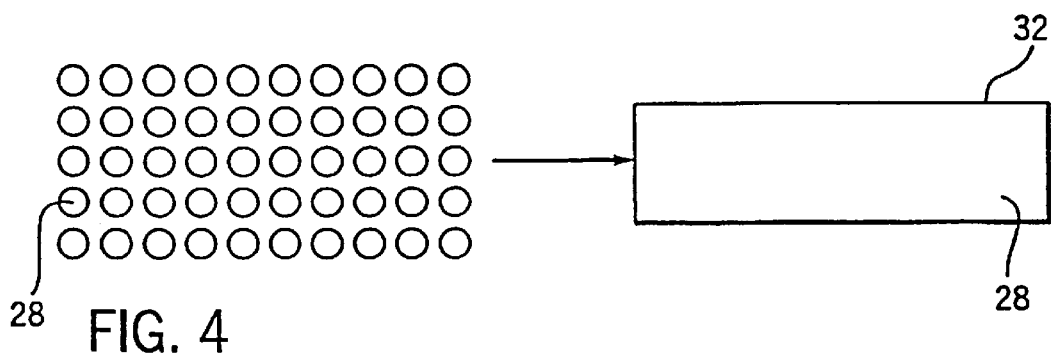
FIG. 4 is an end view of the output end of the fiber optic bundle of FIG. 3.

As shown in FIGS. 1, 3, and 4, the fiber bundle 28 transports the light 17 from the source 20 to a fiber optic terminal 30 that "fans" the light into an optical fiber slit 32 forming a slit shaped illuminating beam 15. The fiber optic slit 32 is approximately shaped like an imager 38 receiving plane to illuminate the area that is being imaged and thus maximally utilize the illumination energy of the illuminating beam 15. The linearly shaped illuminating beam 15, could be produced alternatively by other means known in the art, such as an aperture slit combined with one or more cylindrical lenses.

Referring FIG. 1, the imaging section 16 has a folding mirror 34, a focusing lens system 36, and an imager 36. The illuminating beam 15 emitted by the optical fiber slit 32 of the fiber optic bundle 28 is protected by the lens system 36 to illuminate a linear portion of the barcode 14. A portion of the illuminating beam 15 emitted by the optical fiber slit 32 strikes the back side 33 of the folding mirror 34 blocking approximately half of the lens system aperture (The lens system aperture is the portion of the lens system through which light passes.) forming a light illumination channel and receiving channel. The splitting of the lens system aperture, to provide channels for the illuminating beam and a reflected light beam 18, is necessary to entirely separate the two channels and thus avoid stray light leakage from the high intensity illumination beam into the low light level reflected beam.

The focusing lens system 36 is a combination of lenses that includes a diffraction lens 40 which focuses the slit-shaped illuminating beam 15 onto the barcode 14 generating a linear spectral line. The diffractive lens 40 is the key element of lens system 36. It is designed to focus a different wavelength component of the illuminating beam 15 at every object location in the operational range, as well as focusing that wavelength onto the imager 38. Although the same diffractive lens 40 is used in the preferred embodiment to focus the light on the barcode 14 and the imager 38, different diffractive lenses may be used.

The light from the illuminating beam 15 is reflected off the barcode 14 through the lens system 36. The reflected light 18 is then directed by the folding mirror 34 onto the imager 38. The diffractive lens 40 on the return path tends to focus best the color of light that is focused at the barcode 14, thus adding to the focus selectivity. The folding mirror 34 (first encountered upon exit from the fiber bundle 28) reflects half of the light beam 18, returned through the lens system 36 onto the imager 36 disposed adjacent to the folding mirror 34.

Figure 2:
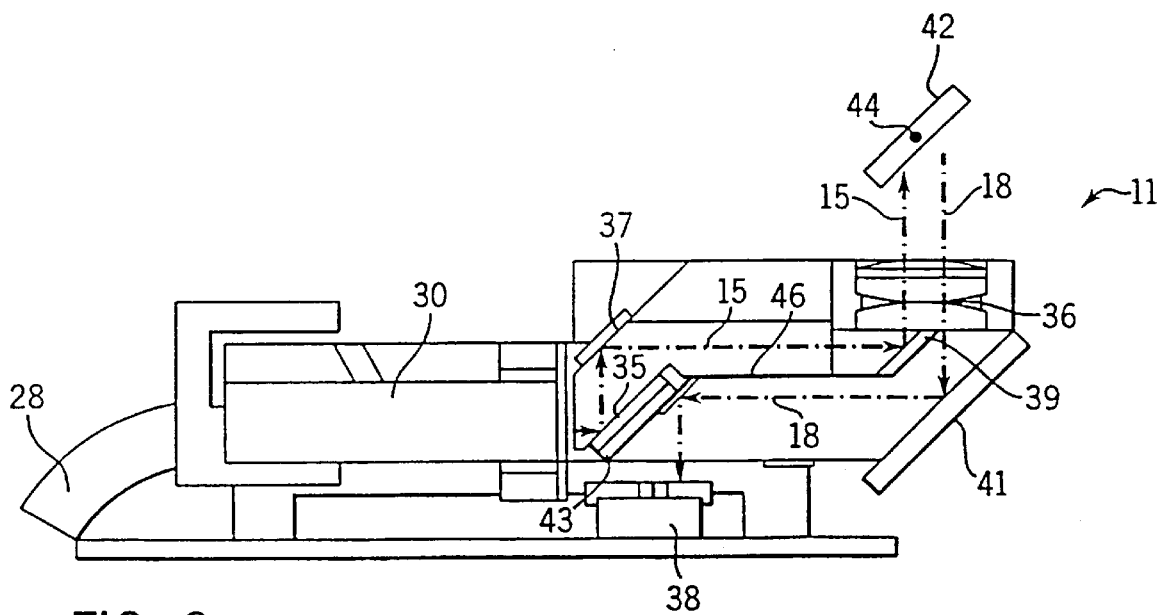
FIG. 2 is a elevational cross sectional view of a barcode scanner incorporating the imaging apparatus of FIG. 1.

The scanner 11, as shown in FIG. 2, incorporates multiple folding mirrors 35, 37, 39, 41, 43 to reduce the scanner size and separate the illuminating beam 15 from the reflected light beam 18 inside the apparatus. Referring to FIG. 2, a fiber optic light source 28, such as described above, projects a slit-shaped illuminating light beam onto folding mirrors 35, 37, 39 that channels the light beam through the lens system 36. Mirrors 41 and 43 channel the reflected light beam 18 through the is scanner 11 and onto the imager 38. The folding mirrors 35, 37, 39, 41, 43 do not adversely affect the autofocusing function of the present invention. Advantageously, folding mirror 39 blocks approximately half of the lens aperture in order to provide a light illumination channel and receiving channel.

Preferably, the illuminating beam 15 projected onto the barcode 14 is steered by a scanning mirror 42 to illuminate the barcode 14 image on the imager 38 pixel row by pixel row. The scanning mirror 42 is interposed between the focusing lens system 36 and the target barcode 14, and it moves the illuminating beam 15 to scan the code surface line by line. The generally flat scanning mirror 42 is pivotally mounted on a shaft 44. As the scanning mirror 42 pivots about the shaft 44 the light beam is fanned across the barcode 14. Preferably the scanning mirror 42 moves the illuminating beam 15 orthogonal to the barcode lines to form a field in which a reflected image can be acquired. Other scanning techniques known in the art, such as described herein, may be used without departing from the invention.

The illuminating beam 15 is reflected off the barcode 14 as a reflected beam 18 The reflected beam 18 is directed through the lens system 36 by the scanning mirror 42. The folding mirrors 41 and 43 then channels the reflected beam 18 onto the imager 38. An opaque partition 46 in the scanner between the illuminating beam 15 and the reflected beam 18 further prevents stray light leakage from the high intensity illuminating beam 15 into the low light level reflected beam 18.

Preferably, the imager 38 is an electronic device, such as a linear Charged Couple Device (CCD) array, that serves to convert the reflected image into an electronic signal. The high resolution linear CCD array forms one axis of the image while the scanning motion of the scanning mirror 42 provides the other axis to form a two-dimensional image of the barcode 14. The high resolution (high pixel count) nature of the CCD combined with a high resolution lens system described herein, lends itself to imaging high density codes that are difficult or impossible to read with other image decoders.

The present invention is based upon the concept that only particular wavelengths, that is color, of the light (illuminating or reflecting) is focused at a particular distance from the diffractive lens 40. At any given distance (within a device working range) a line of one color of light is in focus. All other colors are blurred. If an image of a barcode is presented within this working range, the color of light that is in focus at that given distance has far more brightness than other colors of light.

Figure 5:
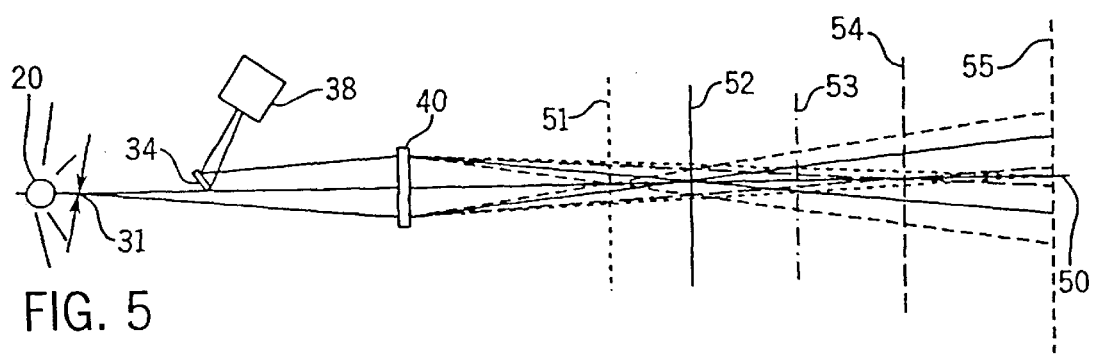
FIG. 5 is an optical schematic of the imaging apparatus of FIG. 1.

There are no moving parts to change the focal distance. Within the working range of the diffractive lens 40, proper focus is inherent to the device. As shown in FIG. 5, due to the relatively large chromatic aberration of the diffractive lens, light projected onto an object will be dispersed so that each wavelength will have its corresponding focusing plane 51–55 perpendicular to the optical axis 50. At object plane 51, for example, the projected illumination line will be blue, while at object plane 55, the projected illumination line will be red. This concept is best illustrated in the following example:

EXAMPLE 1

Figure 6:
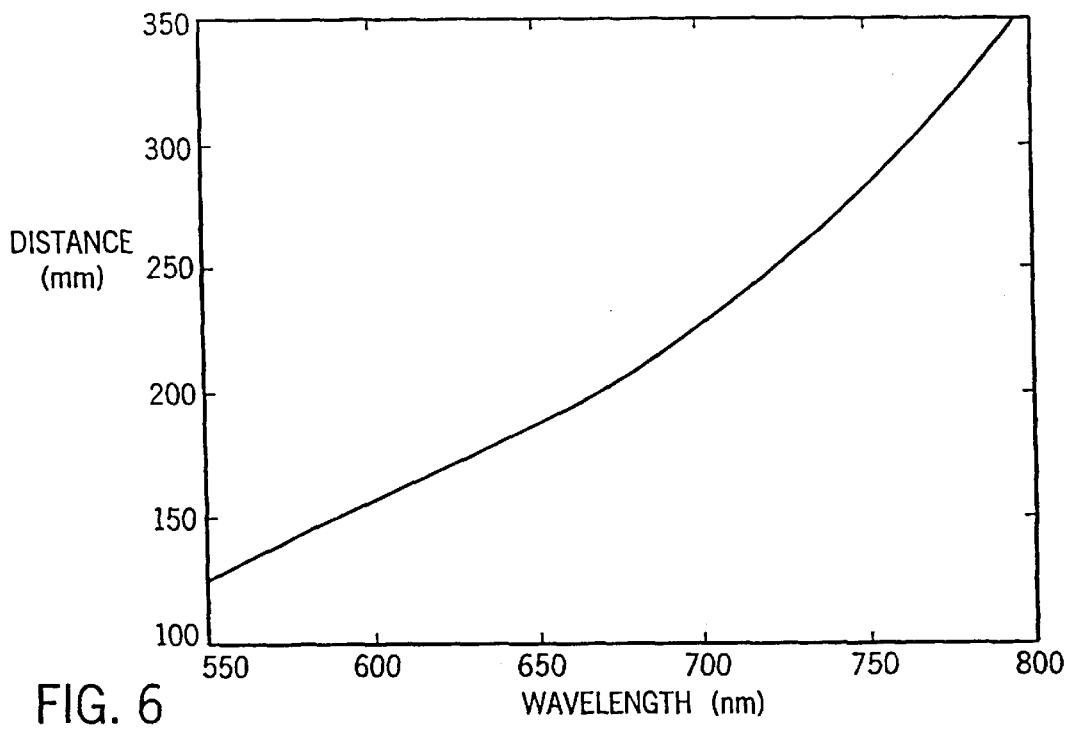
FIG. 6 is a calculated graph showing the focusing distance as a function of the light wavelength, for a specific design of a diffractive lens.

The graph in FIG. 6 depicts the focusing distance as a function of the projected light wavelength, as calculated for the apparatus described above. As is shown, light having a wavelength of approximately 600 nm is focused for a particular diffractive lens at approximately 150 mm. in comparison, light having a wavelength of approximately 750 nm is focused using the same diffractive lens at 280 mm. This demonstrates that the longer the wavelength of light, the longer is the focusing distance.

As described above, light projected onto an object will be focused by a diffractive lens so that each wavelength of light is focused on its corresponding plane perpendicular to the optical axis. Spectral intensity distribution of light, as defined by a blur size, also has a strong dependence on the object position along the optical axis.

The blur size can further demonstrate the concept used in the present invention that a diffractive lens focuses light having different wavelengths at different focal distances. For example, light of wavelength corresponding to the object's location will be focused at the object plane at a high density, while the illuminating light density at the object plane will be reduced for different wavelengths causing a greater blur size. The greater the wavelength deviation from its optimum value, the greater the blur size, the lower will be the projected beam density.

Figure 7:
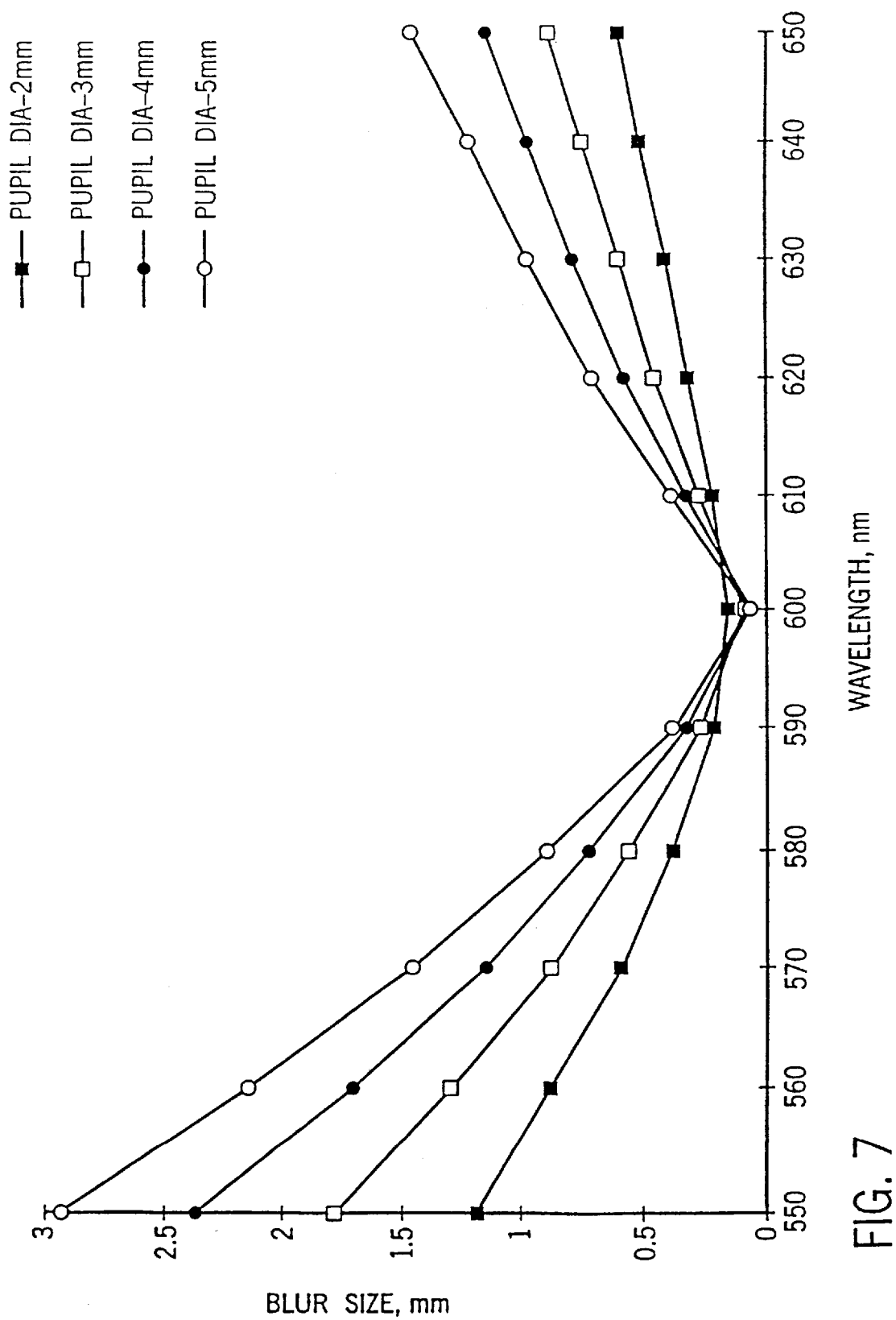
FIG. 7 depicts the calculated blur size for a 200 mm focusing distance, as a function of light wavelength, with the pupil diameter as a parameter.

The graph in FIG. 7 depicts the blur size in millimeter (mm) of a light source image, produced by the diffractive lens having different pupil diameters, as a function of the wavelength, for the focusing distance of 200 mm. As can be seen from this graph, increasing the pupil diameter, causes a decrease of the blur size for a nominal wavelength and a faster increase in the blur size for wavelengths deviating from the nominal wavelength of the given focusing distance. Since higher blur size indicates lower light density, by increasing the pupil diameter, the discrimination between the nominal wavelength and the wavelengths different from the nominal wavelength increases.

Figure 8:
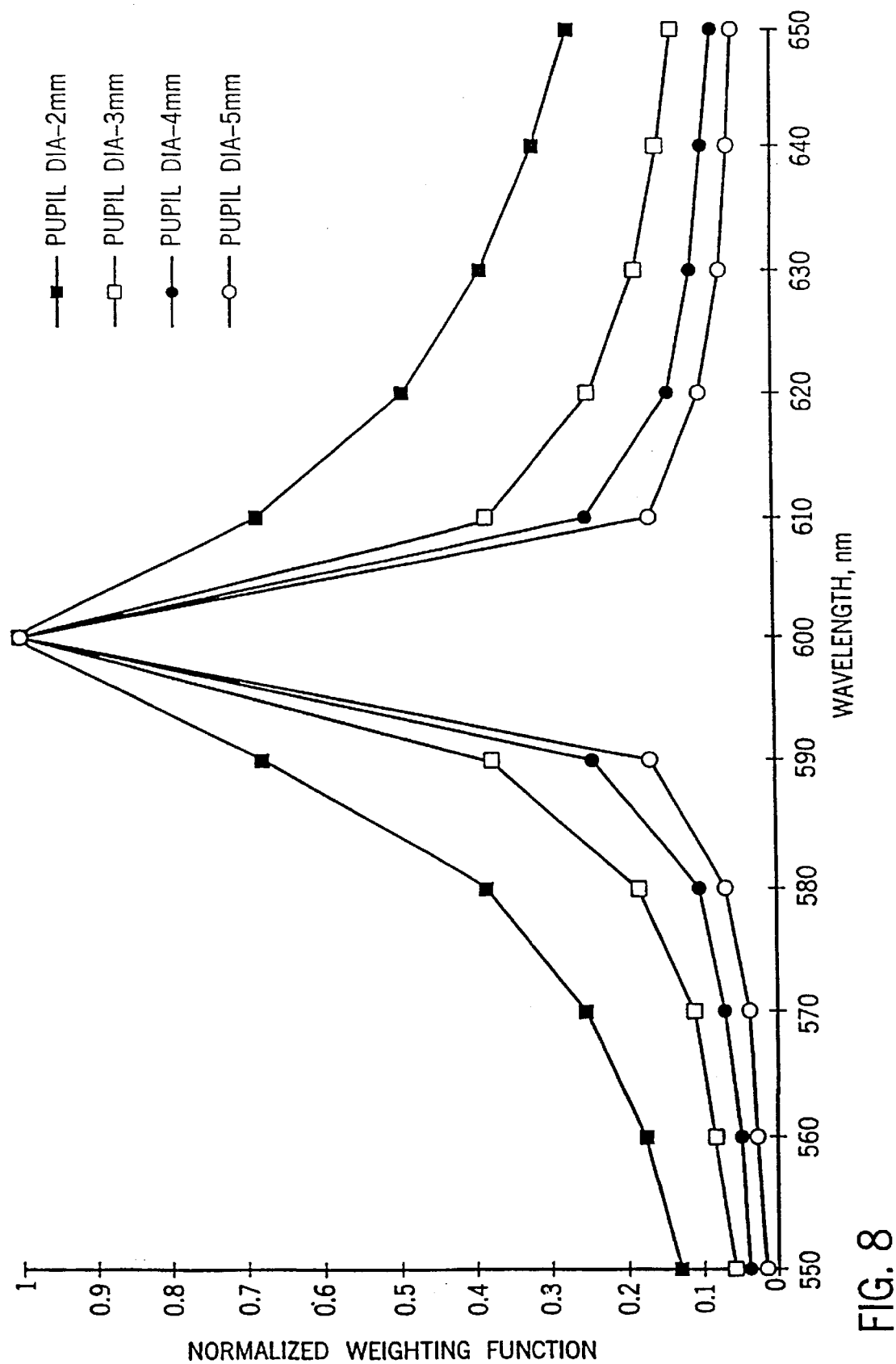
FIG. 8 depicts the normalized weighing function for a 200 mm focusing distance, as a function of light wavelength, with the pupil diameter as a parameter.

The above concept is further demonstrated by a calculated spectral weighing factor. The calculated spectral weighing factor represents the ratio between the light density of the optimum wavelength, for a given focusing distance and the light density for light wavelengths deviating from that optimum. The graph in FIG. 6 depicts the spectral weighing factors for 200 mm focusing distance for four different pupil diameters. It can be seen from FIG. 8 that an increase of pupil diameter will narrow the weighing factor function; i.e., will increase the spectral selectivity of the system.

Figure 9:
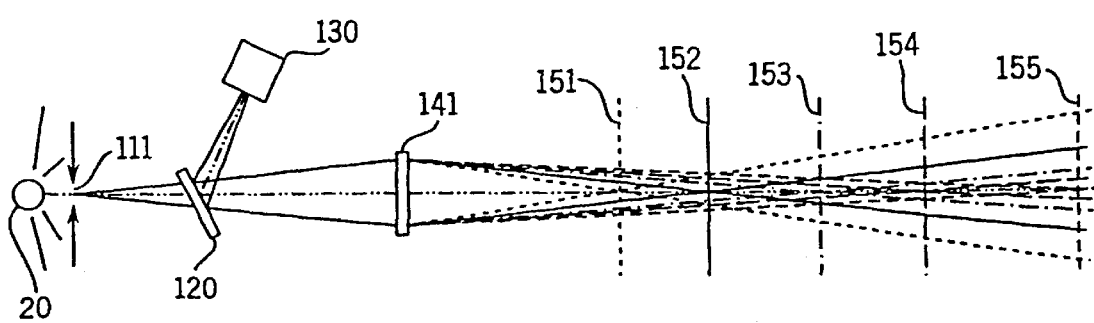
FIG. 9 is a schematic illustration of a second embodiment of an imaging apparatus incorporating the present invention.

A second embodiment of the present invention, shown in FIG. 9, substitutes the folding mirror with a beam splitter 120. The beam splitter is used rather than aperture splitting of the lens system, to separate the illumination beam from the return beam. Looking particularly at FIG. 9, a slit 111 is illuminated by a nonmonochromatic light source 20, as described above. The light source 20 protects the slit image through a beam splitter 120 and a diffractive lens 141 onto an object. The light beam reflected by the object at different locations, shown here at representative distances 151, 152, 153, 154, 155, is collected by the same diffractive lens 141 and reflected by the beam splitter 120, onto the imaging plane of an imager 130.

Figure 10:
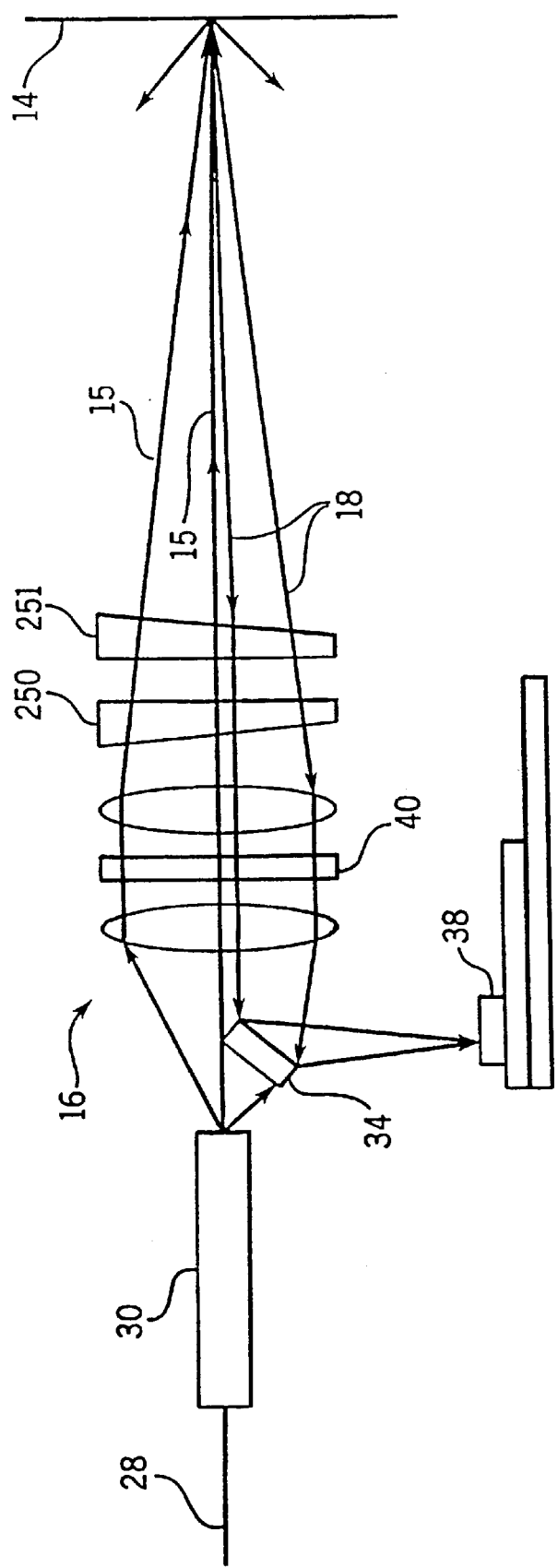
FIG. 10 is a schematic illustration of a third embodiment of an imaging apparatus incorporating the present invention.

In a third embodiment depicted in FIG. 10, the scanning motion is implemented via two counter rotating optical wedges, 250 and 251, that deflect the illuminating beam 15 across the barcode 14. The wedges, 250 and 251, rotate about a common axis. Preferably, the axis of rotation coincides with the optical axis of the lens system 36. In this method of scanning, the beam goes straight out of the scanner rather than being steered by a scanning mirror.

A single optical wedge deviates light rays entering into the wedge on the angle a according to the approximate formula:

$$\alpha = (n-1)\sigma$$

where;
σ=the wedge angle; and
n=the refractive index of the optical wedge.
Rotating of the wedge causes synchronized rotating of rays about the rotating axis. Therefore, rectilinear movement of an image can be performed by synchronized rotating of two optical wedges in opposite directions.

Figure 11A:
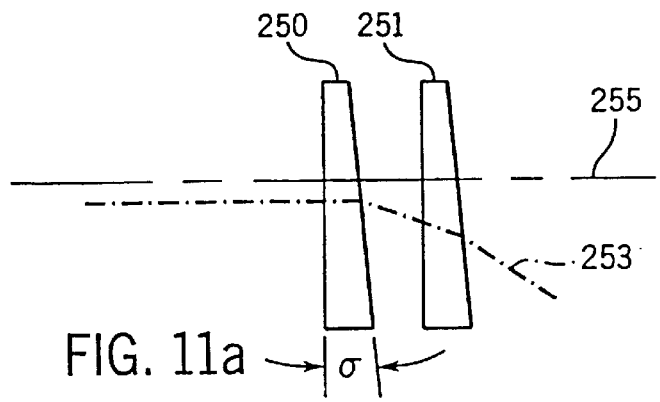
FIG. 11a is a first optical wedge position of the scanning method of FIG. 10.
Figure 11B:
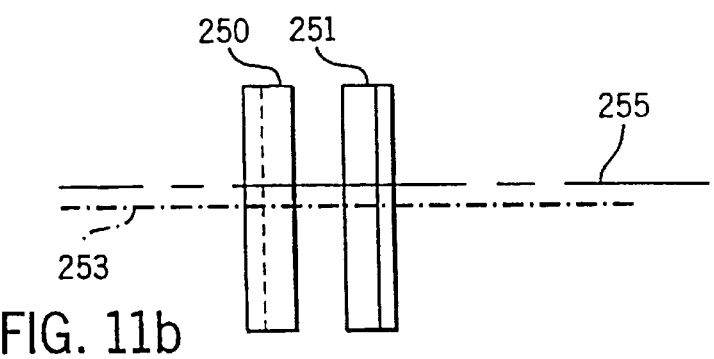
FIG. 11b is a second optical wedge position of the scanning method of FIG. 10.

The following example, as shown in FIGS. 11a–11d, illustrates how the scanning motion is accomplished by counter rotating optical wedges, 250 and 251 about a common axis 255. In a first wedge position shown in FIG. 11a, both wedges, 250 and 251, deviate a light ray 253(and slit image) downwardly Counter rotation of each wedge, 250 and 251, 90 degrees from the first web position provides a second wedge position as shown in FIG. 11b. In the second wedge position, the wedges, 250 and 251, deviate the light ray 53 in opposite directions, so there is no net deviation of the light ray 253 after passing through both wedges, 250 and 251.

Figure 11C:
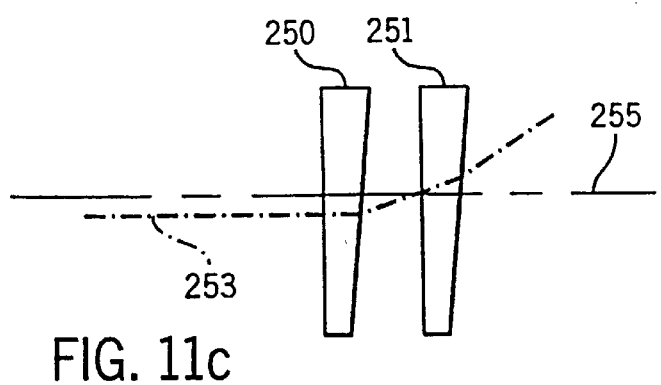
FIG. 11c is a third optical wedge position of the scanning method of FIG. 10.

Counter rotation of the wedges, 250 and 251, 90 degrees from the second position, in the same directions as the first counter rotation, provides a third wedge position as shown in FIG. 11c. In the third wedge position, both wedges, 250 and 251, deviate the light ray 253 upwardly, opposite in direction to the first wedge position.

Figure 11D:
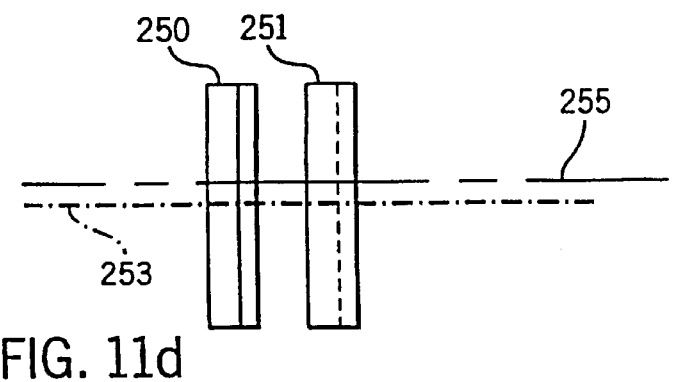
FIG. 11d is a fourth optical wedge position of the scanning method of FIG. 10.

A fourth wedge position, as shown in FIG. 11d, is accomplished by counter rotating the wedges, 250 and 251, 90 degrees from the third wedge position, in the same directions as the as the first and second counter rotations. In the fourth wedge position, the wedges, 250 and 251, deviate the light ray 253 in opposite directions, so there is no net deviation of the light ray 253 after passing through both wedges, 250 and 251.

Continuous, synchronized and smooth rotation of the wedges, 250 and 251, in opposite directions, as illustrated in FIGS. 11a–11d, causes a continuous and smooth light ray deviation in opposite directions is relative to the axis of rotation 255. The amplitude of the light ray deviation depends upon the wedge angle and refractive index of the optical wedge. This particular embodiment is more compact than an embodiment incorporating a pivoting or rotating scanning mirror.

In a fourth embodiment of the invention, the imager is a spectral analysis device. With the addition of spectral analysis capability at an image plane, the invention can be used as a 3D surface shape measuring instrument.

While there has been shown and described what are at present considered the preferred embodiment of the invention, it will be obvious to those skilled in the art that various changes and modifications can be made therein without departing from the scope of the invention defined by the appended claims.

I claim:

1. A method for obtaining a focused image of objects located at various distances from imaging optics, comprising:
    producing a slit-shaped illuminating beam of nonmonochromatic light;
    imaging said slit through a diffractive optical element onto one of said objects, wherein said slit is focused at varying distances for varying wavelengths;
    receiving light reflected from said object, through said diffractive optical element, onto an imager wherein a focused image of said object is obtained on said imager for a light wavelength, producing a focused slit image on said object, with unequivocal dependance between light wavelength, object distance and sharpness of focus.

2. An apparatus for focusing images of objects located at various distances, comprising:
    a non-monochromatic slit-shaped illuminating beam;
    a first diffractive lens for illuminating one of said object by imaging said slit onto said object located at varying distances from said first diffractive lens, wherein said slit image is focused onto said object at varying distances for varying wavelengths of said illuminating beam; and
    a second diffractive lens for imaging said object onto an imager wherein an image of said object is focused onto said imager for said illuminating beam wavelength creating a focused slit image on said object.

3. An apparatus as claimed in claim 2 further comprising:
    a folding mirror partially blocking said illuminating beam: said folding mirror reflects light reflected from said object onto said imager.

4. An apparatus as claimed in claim 3 further comprising an opaque partition between said illuminating beam and said reflected object imaging beam.

5. An apparatus as claimed in claim 2, wherein said first diffractive lens and said second diffractive lens are the same lens.

6. An apparatus as claimed in claim 2, wherein said imager is a linear Charged Couple Device array that converts said image of reflected light into an electrical signal.

7. An apparatus as claimed in claim 2 further comprising a scanning device between said first diffractive lens and said object.

8. An apparatus as claimed in claim 7, wherein said scanning device is a pivotally mounted mirror.

9. An apparatus as claimed in claim 2 further comprising two counter rotating prismatic wedges disposed between said diffractive lens and said object, wherein said wedges deflect said illuminating light beam and said reflected beam.

* * * * *